United States Patent [19]
Brocard et al.

[11] Patent Number: 4,817,375
[45] Date of Patent: Apr. 4, 1989

[54] TURBINE ENGINE FUEL CONTROL SYSTEM

[75] Inventors: Jean-Marie Brocard, Rubelles; Eric Perrodeau, Bourg la Reine; Maurice G. Vernochet, Melun, all of France

[73] Assignee: Societe Nationale d'Etude et de Construction de Moteurs d'Aviation "S.N.E.C.M.A.", Paris, France

[21] Appl. No.: 149,369

[22] Filed: Jan. 28, 1988

[30] Foreign Application Priority Data

Jan. 28, 1987 [FR] France ............... 87 00976

[51] Int. Cl.⁴ .................................... F02C 9/32
[52] U.S. Cl. .................... 60/39.281; 251/285
[58] Field of Search ............ 60/39.281, 243; 251/285

[56] References Cited

U.S. PATENT DOCUMENTS

| 2,642,718 | 6/1953 | Pearl | 60/39.281 |
| 2,879,643 | 3/1957 | Stroh | 60/39.281 |
| 2,986,880 | 6/1961 | Fortmann | 251/285 |
| 3,213,886 | 10/1965 | Pearne | 251/285 |
| 4,033,112 | 7/1977 | Schuster | 60/39.281 |

FOREIGN PATENT DOCUMENTS

| 0107940 | 5/1984 | European Pat. Off. |
| 2495692 | 6/1982 | France |
| 2528495 | 12/1983 | France |

Primary Examiner—Louis J. Casaregola
Attorney, Agent, or Firm—Oblon, Fisher, Spivak, McClelland & Maier

[57] ABSTRACT

A fuel control system for a turbine engine includes a fuel flow regulator comprising a double differential piston slidable in a sleeve to vary the opening and closing of a fuel inlet or outlet and thereby regulate the output flow of fuel from the regulator. A first fixed stop limits the movement of the piston in one direction to define the maximum output flow of fuel permitted by the regulator, while a second stop, in an operative safety position, limits the movement of the piston in the opposite direction to define a minimum fuel output threshold. The second stop can, however, be retracted to an inoperative position by actuation of a control circuit to allow the minimum fuel output threshold to be overcome and the regulator piston to reach an extreme nil outflow position.

8 Claims, 3 Drawing Sheets

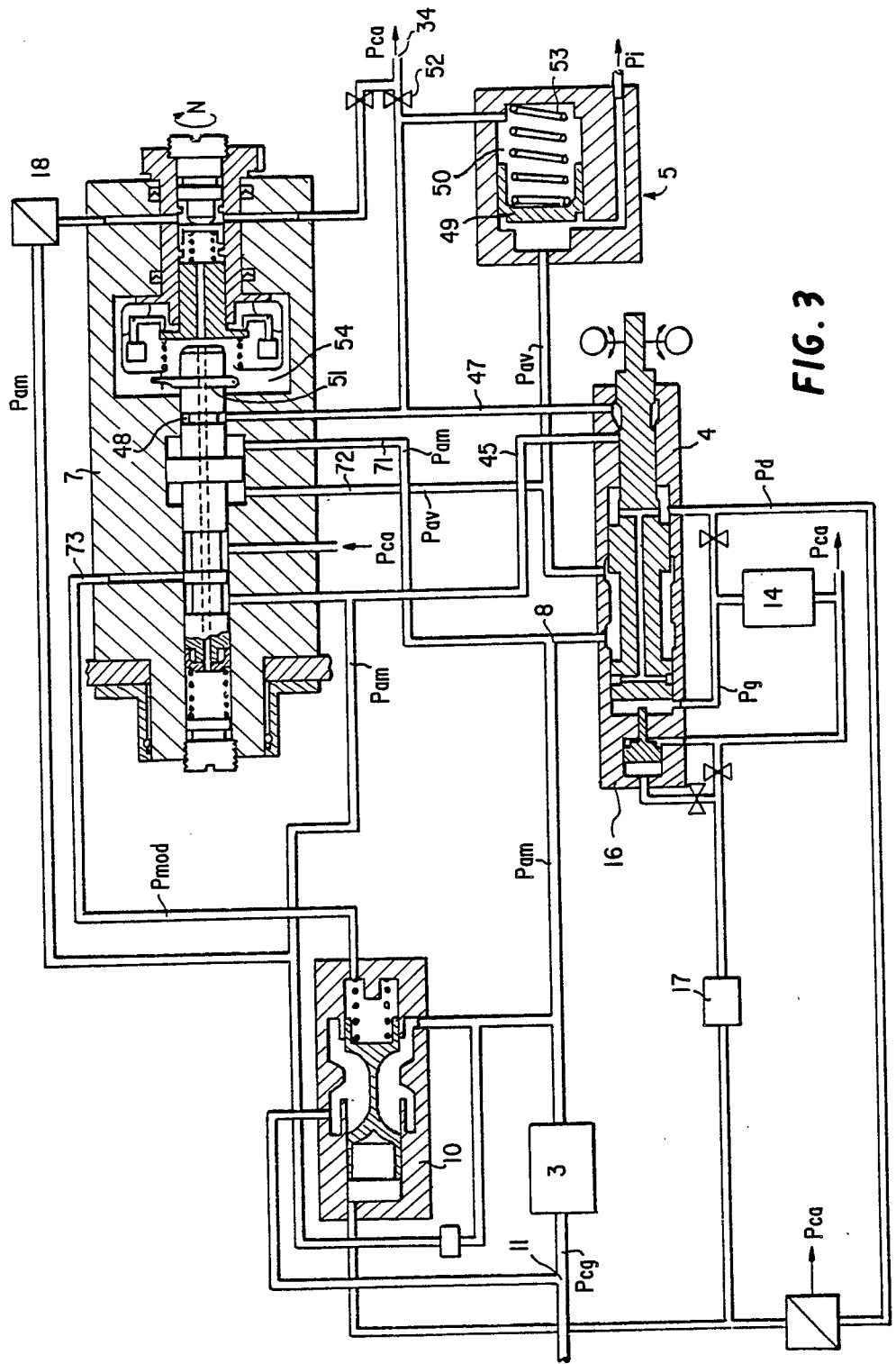

TURBINE ENGINE FUEL CONTROL SYSTEM

BACKGROUND OF THE INVENTION

1. Field of the Invention

The present invention relates to a fuel control system with improved fuel feed control, particularly for turbine-engines.

2. Summary of the Prior Art

Fuel control systems for turbine engines are known which comprise a flow regulator having its upstream side connected to the output of a proportioning pump and its downstream side to an injection device, a control valve mounted in a by-pass between the pump and the flow regulator, a pressure drop detector intended to provide an output at a modulated pressure Pmod dependent upon the pressure drop Pam-Pav wherein Pam and Pav are the pressures measured upstream and downstream respectively of the flow regulator, the Pmod output acting on the control valve to open or close it when the pressure drop across the flow regulator varies so as to keep the pressure drop substantially constant, an overspeed limiter responsive to the rotational speed of the turbine engine to reduce the injection flow in the user installation when a fixed overspeed threshold is exceeded so as to prevent possible racing of the engine, a stop valve capable of stopping, on command, the flow of fuel injected into the plant, and a control computer for controlling the foregoing components.

It is current practice in this type of control system to provide a control valve mounted in series with the flow regulator, the valve being actuated by a pilot pressure to limit the flow in the event of selected working parameters of the engine exceeding predetermined levels. GB Pat. No. 1 465 480 discloses an example of this type of system in which the pilot pressure is controlled by a torque-motor which is actuated by current intensity signals originating from a control circuit which operates in response to the aforesaid working conditions of the engine.

It is also known from FR Pat. No. 2 495 692 to actuate the control valve electrically through torque motors at two levels of excitation, one enabling the valve to retain a mid position authorizing an output flow and the other causing it to assume a position in which the outlet of the valve is sealed and the output flow is therefore nil.

In other arrangements fuel cut-off is ensured by means different from those which provide the fuel regulation, for safety reasons.

These prior systems meet the aim, regarded as desirable, of ensuring that all aspects of the control of the engine, including starting and stopping, are controlled electrically. For this purpose the systems require the presence of control torque motors as well as of an intermediate valve controlling the stop valve.

However, in the interests of reliability of this type of fuel control system for turbine engines, it is desirable that the number of control components utilized be at a minimum.

It is an object of the present invention therefore to improve the reliability of systems of this known type without increasing the hydraulic complexity.

Another object of the invention is to permit starting the turbine engine directly by means of the control computer acting only on the flow regulator by providing the latter with means enabling it to pass from a nil flow position to a position ensuring ignition flow.

A further object of the invention is to provide a control system in which the flow regulator is able to return to the nil flow position only under selected conditions, preferably presenting no danger.

SUMMARY OF THE INVENTION

According to the invention, these objects are achieved by providing a fuel control system, particularly for a turbine engine, comprising a high pressure proportioning pump for providing a supply of fuel at a pressure Pam, a feed flow regulator connected to receive fuel at said supply pressure Pam from said pump and adapted to provide an output flow at a delivery pressure Pav, a fuel injection system connected to receive said output flow from said flow regulator, a pressure drop detector responsive to said supply and delivery pressures Pam and Pav to provide a control pressure signal Pmod dependent on the pressure drop Pam-Pav, a control valve also connected to said fuel supply from said pump and responsive to said control pressure signal Pmod to control said fuel supply to said flow regulator so as to maintain said pressure drop Pam-Pav substantially constant, an overspeed limiter adapted to detect the rotational speed of said turbine engine and operative to reduce the flow of fuel to said injection system in response to the speed of said engine exceeding a preset overspeed threshold, a stop valve connected between said flow regulator and said injection system capable of shutting off the flow of fuel from said flow regulator to said injection system, and a control computer for controlling said system, wherein said feed flow regulator comprises a sleeve including means defining a fuel inlet port and a fuel outlet port, a double differential piston slidably mounted in said sleeve and adapted to vary the opening of at least one of said inlet and outlet ports to control said output flow, a first fixed stop limiting the movement of said double differential piston at a position defining a maximum fuel output flow rate, a second stop movable between an inoperative position and an operative, safety position limiting the movement of said double differential piston at a position defining a minimum fuel output flow threshold, and control circuit means actuatable to retract said second stop to said inoperative position to allow said minimum output flow threshold to be crossed and said double differential piston to reach a nil output flow position.

Preferably the feed regulator includes a slide rigidly connected to said double differential piston, an auxiliary input port connected to said supply of fuel at pressure Pam, and an auxiliary output port connected to said stop valve and to said pressure drop detector, said slide having an annular chamber adapted to establish communication between said auxiliary input port and said auxiliary output port when said second stop is retracted and said double differential piston approaches said nil output flow position whereby said supply pressure Pam is applied to said stop valve to cause said stop valve to close and also to said pressure drop detector to cause said detector to open said control valve, said control valve being connected to return said fuel supply at pressure Pam from said pump to a position upstream thereof.

Preferably the sleeve of the flow regulator comprises an end wall and a partition wall defining an enclosure separated by said partition wall from the portion of said sleeve within which said double differential piston slides, and said second stop comprises a piston movable in said enclosure and dividing said enclosure into first and second stop control chambers, and an axial needle integral with said stop piston and passing movably through said partition wall to provide said second stop for said double differential piston, said control circuit means including a solenoid valve and a throttle for permitting fuel at said supply pressure Pam to be supplied to said first stop control chamber to move said second stop to its operative position, a spring in said second stop control chamber, and means for releasing pressure from said first stop control chamber when said solenoid valve is closed to allow said second stop to move to said inoperative position.

BRIEF DESCRIPTION OF THE DRAWINGS

FIG. 3 shows one example of the hydraulic circuit of the control system diagrammatically represented in FIG. 1, and in Which the flow regulator of FIG. 2 is incorporated.

DESCRIPTION OF THE PREFERRED EMBODIMENT

Figure 1:
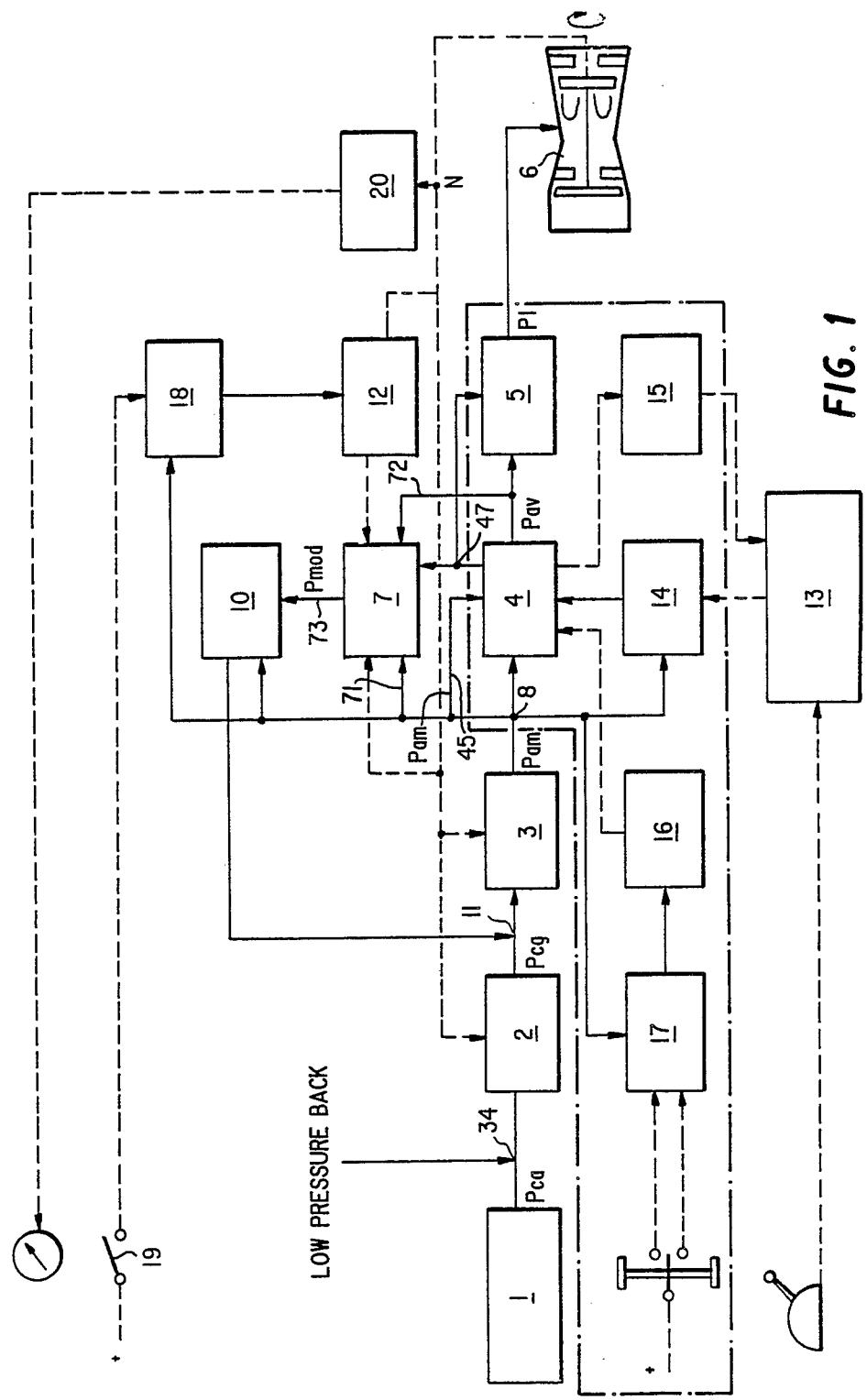
FIG. 1 is a block diagram of a fuel control system which incorporates the present invention. In this diagram, hydraulic connections are represented by continuous lines, mechanical connections by short dashed lines, and electrical connections by long dashed lines.

FIG. 1 shows a block diagram of the fuel control system of a turbine engine. The installation comprises a high pressure pump 3 supplied with fuel from a tank 1 by a low pressure pump 2. The pump 3 is of the proportioning type and delivers a flow of fuel proportional to the operation of the turbine engine to a flow regulator 4 Which, through a valve 5 (referred to hereafter as a stop valve), supplies the main fuel injection system for the combustion chamber of the turbine engine 6.

A pressure drop detector 7 receives at two inlets 71 and 72 the pressure Pam, taken at point 8 situated between the high pressure pump 3 and the flow regulator 4, and the pressure Pav taken downstream of the regulator 4. Under the action of fuel at pressure Pam taken at point 8, the detector 7 provides at its outlet 73 a pressure Pmod which controls the opening or closing of a control valve 10 having an input connected to the point 8 at pressure Pam, and an output connected upstream to a point 11 in the pipe connecting the low pressure pump 2 and the high pressure pump 3.

The control valve 10 operates in response to the detection of a variation of the pressure drop Pam-Pav across the flow regulator to by-pass the excess fuel which is situated between the high pressure pump 3 and the regulator 4 so as to keep the pressure drop constant in the regulator, which is a condition for the fuel flow supplied to the injectors, which is proportional to the flow passage cross-section of the regulator and to the square root of the pressure drop, to be a function only of the displacement of the regulator piston.

An overspeed limiter 12, which is driven by the turbine engine and receives input information on the rotational speed N of the turbine engine, is operative to reduce the flow in the injection system of the turbine plant 6 when an overspeed threshold is reached so as to keep the plant at a tolerable speed. To do so, the overspeed limiter has a bushing disposed in a bore coaxial with a slide of the pressure drop detector 7 which it drives in rotation and on which it is able, on exceeding the overspeed threshold, to act in the same direction as when an increase of the pressure drop is detected by the detector 7 to reduce the pressure Pmod at the output of the detector. The effect of this is to open the control valve 10 quickly, and thus reduce the flow to the receiver installation 6, thereby preventing the operating rate from increasing further and avoiding the destruction of the engine.

As will be explained later in greater detail, the feed regulator 4 comprises a differential piston, and the displacement of the piston is controlled by a control computer 13 which acts on one or more servo-valves 14 to modify the pressure in the control chambers of the piston, while the position of the regulator is measured by one or more displacement detectors 15 which transmit the position data to the computer 13.

The displacement of the flow regulator towards its minimum flow position is limited, as will be described further below, by a safety stop 16 which can be retracted by actuation of an electro-valve 17 to enable the regulator 4 to assume a position of closure or of nil outflow, in which position an annular chamber of the regulator permits a control pressure Pam taken at point 8 to be supplied to the stop valve 5 to close the stop valve 5 and cut off the injection system.

To complete the description of FIG. 1, there is also provided a solenoid valve 18 actuatable by a switch 19 to communicate the pressure Pam with a chamber of the overspeed limiter 12 so as to be able to test, on the ground, the displacement of the said limiter and of the pressure drop detector 7 and thus check whether the two components can operate normally. However, this test function does not fall expressly within the scope of the present invention, any more than the presence of a detector 20 for measuring and transmitting the engine rate to the pilot's cockpit.

Figure 2:
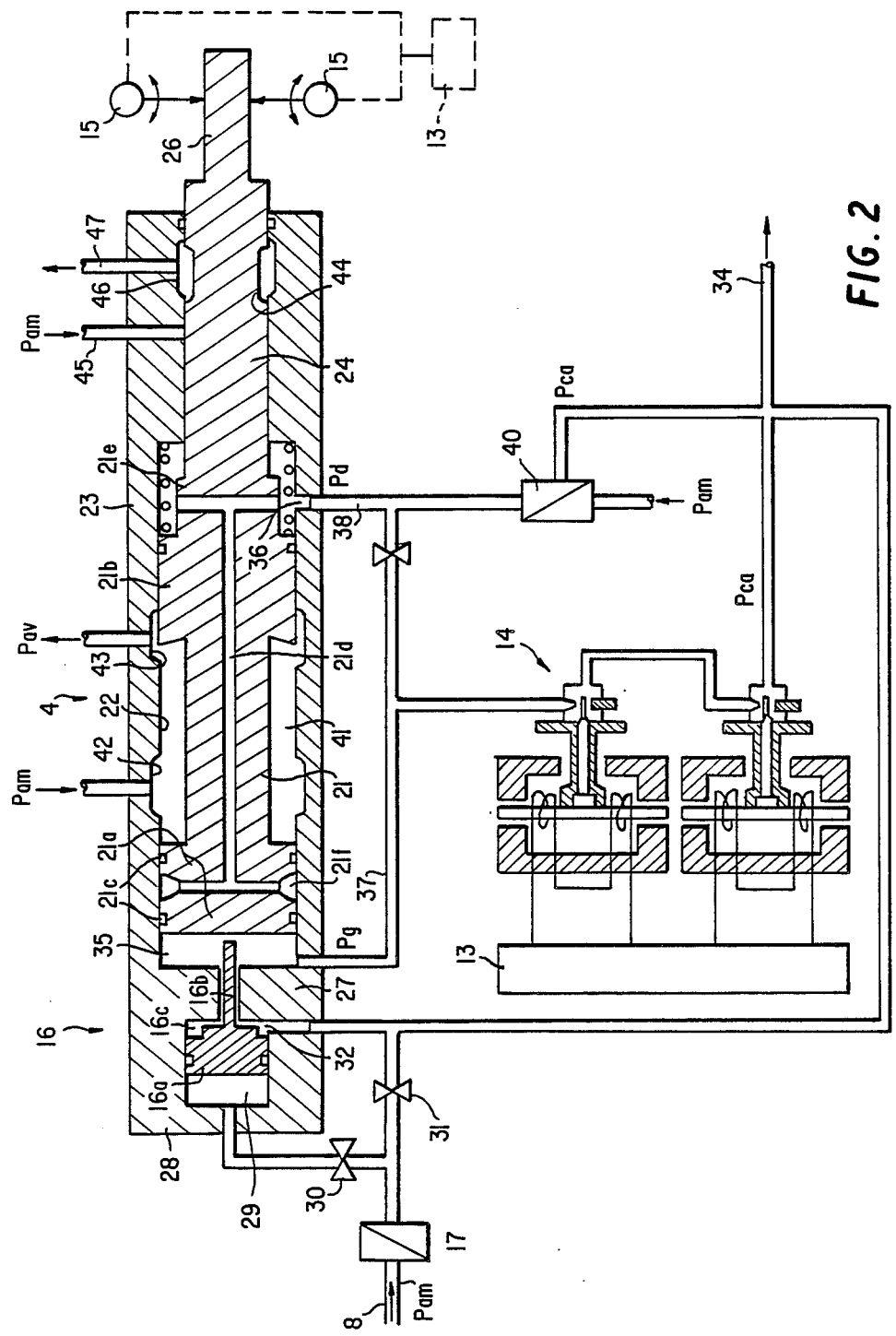
FIG. 2 shows one embodiment of the flow regulator of a control system in accordance with the invention, together with control means for the regulator.

Reference will now be made to FIGS. 2 and 3 for further description of some of the components of the control system, the same reference numerals being used for identical elements.

The flow regulator 4 comprises a double differential piston 21 made up of two pistons 21a and 21b rigidly connected to each other and having the same diameter, disposed in a bore 22 of a sleeve 23. A cylindrical slide 24 disposed in a coaxial bore of smaller diameter in the sleeve 23 is rigid with the double piston 21 adjacent the piston 21b and passes in a fluid-tight manner through the end 25 of the sleeve 23 (at the right in FIG. 2). A displacement detector 15 (or two detectors constituting a redundant measuring chain) is connected to the end 26 of the slide 24 and is arranged to transmit the position of the piston 21 to the control computer 13.

The displacement of the regulator piston 21 towards the right, and thus towards the maximum flow position, is limited by a mechanical stop 21e. At the other end of the sleeve the displacement of the regulator piston 21 is limited at its minimum flow position by the safety stop 16. The latter is disposed at the end 28 of the sleeve 23 (opposite the end 25 and on the left in FIG. 2) and comprises a piston 16a disposed in the sleeve between the end 28 and an intermediate partition 27. A needle 16b. passing through the partition 27 is integral with the piston 16a and its free end constitutes the actual stop for the regulator piston 21.

The end 28 of the sleeve and the piston 16a form a chamber 29 which is supplied with fuel through a first throttle 30 from the bistable solenoid valve 17, the latter receiving the fuel at the high pressure Pam from point 8. A chamber 32 formed between the piston 16a and the partition 27 contains a counterspring 16c and is connected by a pipe 33 to the fuel supply at low pressure Pca at a point 34 situated between the tank 1 and the booster pump 2. A throttle 31 disposed between the pipe 33 and the downstream side of the solenoid valve 17 permits, on closure of the valve 17, discharge of the pressure from the chamber 29 towards the point 34.

Between the partition 27 and the regulator piston 21a and between the regulator piston 21b and the end 25 of the sleeve, there are two control chambers 35 and 36 respectively. The chamber 36 is of smaller cross-sectional area and receives fuel at a pressure Pd through a pipe 38 and a pressure reducing valve 40 from the point 8 at the high pressure Pam. The chamber 35 receives fuel at a pressure Pg through a pipe 37 which is connected to the pipe 38 at the pressure Pd through a throttle, and which is also connected to the computer controlled servo-valve 14 to modulate the pressure Pg which is supplied to the chamber 35 to act on the left-hand side of the piston 21a against the pressure Pd and a counterspring situated in the chamber 36.

The chamber 41 of the flow regulator formed between the pistons 21a and 21b is in communication with two annular ports 42 and 43 of the sleeve 23, the former receiving fuel at the pressure Pam whereas the latter delivers, as a result of the relative movements of the piston 21b masking to varying degrees the port 43, metered fuel at the pressure Pav to the stop valve 5. Fuel leaks between the chambers 41 and 35 which would disturb the control of the feed regulator are prevented by two O-rings 21c and an annular groove 21f disposed between the two O-rings and communicating with the chamber 36 through radial channels and an inner bore 21d to accommodate the breakage of one of the two O-rings 21c.

When the solenoid valve 17 is opened, the pressure in the chamber 29 is such that the piston 16a is biased towards the right into a position wherein the needle 16b constitutes the safety stop of the flow regulator piston. In this position of the stop, the piston 21b is prevented from masking completely the output port 43. The delivery flow cannot therefore reach values below a predetermined value.

When the solenoid valve 17 is closed, the stop 16 retracts to the left and allows the regulator piston 21 to move fully to the left so that the piston 21b masks completely the output port 43. In this extreme left position of the regulator, an annular chamber 44 of the slide 24 establishes communication between a pipe 45 carrying fuel at the pressure Pam taken from point 8, and a port 46 of the sleeve serving a delivery pipe 47. This pipe 47 conducts the fuel at high pressure Pam to a chamber 48 of the pressure drop detector 7 and also to a control chamber 50 of the stop valve 5.

In the chamber 48 of the detector 7 the pressure Pam modifies the equilibrium of the latter in the direction which produces a reduction of the Pmod pressure which will open the control valve 10 to return upstream of the high pressure pump 3 the flow of fuel delivered upstream of the closed feed regulator 4. To do this, the chamber 48 of the pressure drop detector communicates through an inner bore 51 with an end chamber 54 of the detector to subject the chamber 54 to the pressure Pam and thereby move the pressure drop detector to the left, i.e. in the same direction as in the event of an increase in the pressure drop across the feed regulator, to control the displacement of the control valve to the open position. In the absence of the stop command, the chambers 48 and 54 of the pressure drop detector are subjected to the flow pressure Pca (34) through a throttle 52.

The control chamber 50 of the stop valve 5 houses a piston 49 subjected in normal operation (i.e. when the flow regulator is operating to deliver fuel to the injectors) on one side to the pressure Pav of the fuel which is delivered to the engine 6, and on the other side to the low pressure Pca and to the thrust of a counterspring 53 disposed in the control chamber 50. On the flow stop command being given, the chamber 50 is subjected to the pressure Pam and the piston 49 of the valve is moved to bear on its seat and thereby stop in a fluid-tight manner the flow of fuel to the injection system.

The safety stop in the control system in accordance with the invention can be put into effect or retracted at any time during flight. Its role is to prevent an accidental travel of the regulator piston towards possibly dangerous low delivery rates, and is particularly useful during low altitude approach. It is also very useful in flight when, in the event of a breakdown, it affords time for thought before switching over to the other electronic control chain, as it prevents the flow regulator from closing to too low an output, thereby preventing an unpleasant "thrust hole" or even a cutting out of the engine, and permitting a rapid restoration of normal flow.

It also has the advantage of enabling the starting of the turbine engine to be effected by the control computer, and that its stopping requires the concordance of a first command originating from the computer (and thus from the throttle lever) and of a second command originating from the deliberate control of the stop.

What is claimed:

1. Fuel control system, particularly for a turbine engine, comprising:
    a high pressure proportioning pump for providing a supply of fuel at a pressure Pam,
    a feed flow regulator connected to receive fuel at said supply pressure Pam from said pump and adapted to provide an output flow at a delivery pressure Pav,
    a fuel injection system connected to receive said output flow from said flow regulator,
    a pressure drop detector responsive to said supply and delivery pressures Pam and Pav to provide a control pressure signal Pmod dependent on the pressure drop Pam-Pav, substantially constant,
    a control valve also connected to said fuel supply from said pump and responsive to said control pressure signal Pmod to control said fuel supply to said flow regulator so as to maintain said pressure drop Pam-Pav substantially constant,
    an overspeed limiter adapted to detect the rotational speed of said turbine plant and operative to reduce the flow of fuel to said injection system in response to the speed of said plant exceeding a preset overspeed threshold,
    a stop valve connected between said flow regulator and said injection system capable of shutting off the flow of fuel from said flow regulator to said injection system,
    and a control computer for controlling said system, wherein said feed flow regulator comprises a sleeve including means defining a fuel inlet port and a fuel outlet port, a double differential piston slidably mounted in said sleeve and adapted to vary the opening of at least one of said inlet and outlet ports to control said output flow, a first fixed stop limiting the movement of said double differential piston at a position defining a maximum fuel output flow rate, a second stop movable between an inoperative position and an operative, safety position limiting the movement of said double differential piston at a position defining a minimum fuel output flow threshold, and control circuit means actuatable to retract said second stop to said inoperative position to allow said minimum output flow threshold to be crossed and said double differential piston to reach a nil output flow position.

2. Fuel control system as claimed in claim 1, wherein said flow regulator includes a slide rigidly connected to said double differential piston, an auxiliary input port connected to said supply of fuel at pressure Pam, and an auxiliary output port connected to said stop valve and to said pressure drop detector, said slide having an annular chamber adapted to establish communication between said auxiliary input port and said auxiliary output port when said second stop is retracted and said double differential piston approaches said nil output flow position whereby said supply pressure Pam is applied to said stop valve to cause said stop valve to close and also to said pressure drop detector to cause said detector to open said control valve, said control valve being connected to return said fuel supply at pressure Pam from said pump to a position upstream thereof.

3. Fuel control system as claimed in claim 1, wherein said sleeve and said double differential piston define two control chambers at opposite ends of said piston, and said system includes at least one servo valve for controlling the displacement of said double differential piston in said sleeve by modulation of the pressures applied to at least one of said control chambers.

4. Fuel control system as claimed in claim 1, wherein said sleeve comprises an end wall and a partition wall defining an enclosure separated by said partition wall from the portion of said sleeve within which said double differential piston slides, and said second stop comprises a piston movable in said enclosure and dividing said enclosure into first and second stop control chambers, and an axial needle integral with said stop piston and passing movably through said partition wall to provide said second stop for said double differential piston, said control circuit means including a solenoid valve and a throttle for permitting fuel at said supply pressure Pam to be supplied to said first stop control chamber to move said second stop to its operative position, a spring in said second stop control chamber, and means for reducing pressure from said first stop control chamber when said solenoid valve is closed to allow said second stop to move to said inoperative position.

5. Fuel control system as claimed in claim 2, wherein said stop valve comprises a chamber, a fuel inlet connected to receive and deliver to said chamber said output flow at said delivery pressure Pav from said feed regulator, a fuel outlet for delivery of said output flow from said chamber to said injection system, a valve closure seat disposed between said fuel inlet and said fuel outlet, a valve member movable in said chamber, a spring in said chamber biasing said valve member towards said closure seat, and a control pressure inlet to said chamber on the opposite side of said valve member from said fuel inlet and said fuel outlet, said control pressure inlet being connected to a low pressure Pca during operation of said flow regulator between said maximum and minimum output flow rates whereby said delivery pressure Pav holds said stop valve open, and said control pressure inlet being connected to said supply pressure Pam to move said valve member into sealing engagement with said closure seat when said second stop is retracted and said double differential piston moves to said nil flow position.

6. Fuel control system as claimed in claim 2, wherein said pressure drop detector comprises a control chamber which receives said supply pressure Pam when said second stop is retracted and said double differential piston moves to said nil flow position, an end chamber, and a slide having an internal bore which communicates said control chamber with said end chamber whereby subjection of said end chamber to said supply pressure Pam moves said slide in the same direction as an increase of the pressure drop Pam-Pav so as to command said control valve to open.

7. Fuel control system as claimed in claim 6, wherein said control chamber of said pressure drop detector is connected to said low pressure Pca through a throttle when said second stop is in its operative position and said supply pressure Pam is not communicated to said auxiliary output port of said flow regulator.

8. Fuel control system as claimed in claim 3, wherein said double differential piston is provided with two axially spaced O-rings adjacent said control chamber which is subjected to pressure modulation by said servo-valve, an annular peripheral groove between said two O-rings, and radial channels and a central bore which communicate said annular groove with the other of said control chambers.

* * * * *

UNITED STATES PATENT AND TRADEMARK OFFICE
CERTIFICATE OF CORRECTION

PATENT NO. : 4,817,375
DATED : APRIL 4, 1989
INVENTOR(S) : JEAN-MARIE BROCARD, ERIC PERRODEAU and MAURICE G. VERNOCHET It is certified that error appears in the above-identified patent and that said Letters Patent is hereby corrected as shown below:

In column 1, line 9, delete "bine-engines" and insert --bine engines--.

In column 7, line 39, delete "servo valve" and insert --servo-valve--.

Signed and Sealed this

Twenty-ninth Day of May, 1990

Attest:

HARRY F. MANBECK, JR.

Attesting Officer

Commissioner of Patents and Trademarks